June 29, 1948.   L. B. HUTHSING   2,444,228
AUTOMATIC CONTROL MEANS FOR MACHINE TOOLS Filed Nov. 22, 1943   3 Sheets-Sheet 1

LEO B. HUTHSING,
INVENTOR.

BY
ATTORNEY.

Leo B. Huthsing, INVENTOR.

June 29, 1948.  L. B. HUTHSING  2,444,228
AUTOMATIC CONTROL MEANS FOR MACHINE TOOLS
Filed Nov. 22, 1943  3 Sheets-Sheet 3
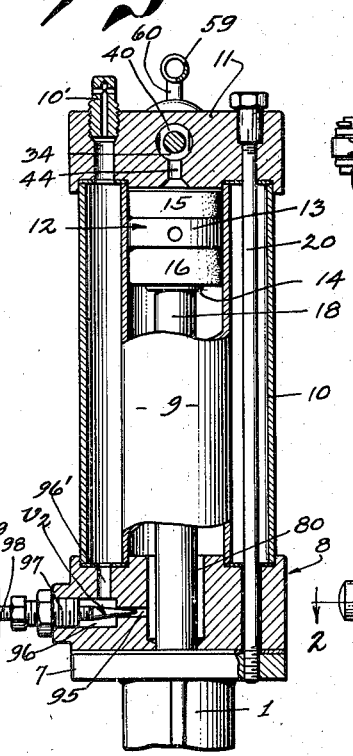
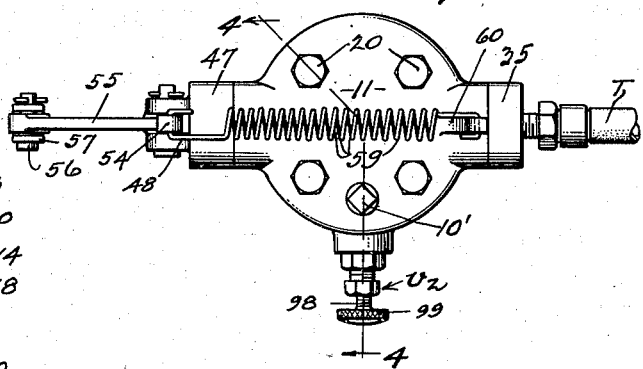
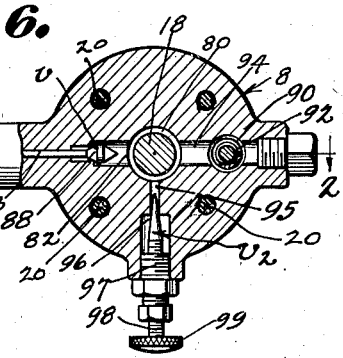
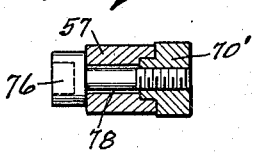
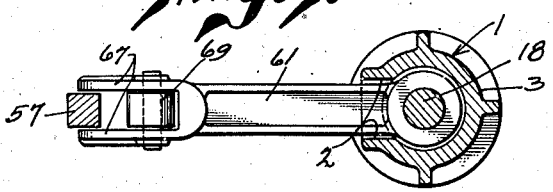
Leo B. Huthsing,
INVENTOR.
BY
ATTORNEY.

Patented June 29, 1948

2,444,228

UNITED STATES PATENT OFFICE 2,444,228

AUTOMATIC CONTROL MEANS FOR MACHINE TOOLS

Leo B. Huthsing, Los Angeles, Calif.

Application November 22, 1943, Serial No. 511,260

5 Claims. (Cl. 77—32)

This invention comprehends the provision of an attachment which is readily applicable to boring, drilling, reaming, broaching, milling, punching, turning, tapping, or other machine tools of conventional or special design for the purpose of rendering such tools automatically instead of manually operative, and which is equally effective for operations on different types of work, regardless of the depth of the bore or the number of spacing of axially alined holes or slots to be bored, drilled, tapped, broached, milled, punched, reamed, or any other operation capable of being performed by other types of machine tools to which my control device is applicable.

An object is to provide a simple mechanism which is operated, as by means of pressure or force applied to the tool supporting quill, arbor, tool holder, or spindle for initially advancing the same from a position of rest into position for engagement with the work, and thereafter through the work at a relatively reduced speed.

An object, also, is to provide controls for machine tools which initially or intermittently effect the rapid advance movement of the tool to a position of operative engagement with the work, or selectively, between positions of operation on the work, and following each operative engagement of the tool with the work, reduces the speed and progress of the tool through the work in one or more stages to a practical extent.

A further object is to provide a hand or foot operated starting member which is adapted to initiate the movement of the tool in the direction of the work and which is provided with means cooperating with relatively stationary means for selectively regulating the stroke of the quill or tool holder as may be necessary under varying conditions and with varying types of work and operations thereon.

A still further object is to provide means for attaching my control mechanism as a unit to a part of a machine tool without requiring changes in the machine to which my attachment is applied.

Briefly, then, in the consideration of this invention, it may be understood that I seek to provide an automatic control mechanism for boring, drilling, reaming, tapping and other machines which may include an operating member applicable to the end of a tool holding quill arbor, broach, spindle, or tool holder by means of which pressure or energy applied to the operating member is also applied to the tool throughout the range of its stroke or movement, and which is effective for advancing the tool rapidly to operative position on the work and at a substantially slower speed through the work, and thereafter retracting the tool and operating member simultaneously to normal position for a succeeding operation.

In the accompanying drawings I have shown my improvements particularly adapted for and applied to a conventional type of drill press but it will be obvious to those familiar with machine tools that I may employ my attachment in connection with other types of machines with equally good results. I have, therefore, shown in the drawings, a preferred form of invention, subject to modification, within the scope of the appended claims, without departing from the spirit of the invention.

In said drawings:

Fig. 4 is a section on line 4—4 of Fig. 5;

Fig. 5 is a top plan view;

Fig. 6 is a sectional plan on line 6—6 of Fig. 2;

Fig. 7 is a sectional plan on line 7—7 of Fig. 2; and

Fig. 8 is a section on line 8—8 of Fig. 2.

Figure 1:
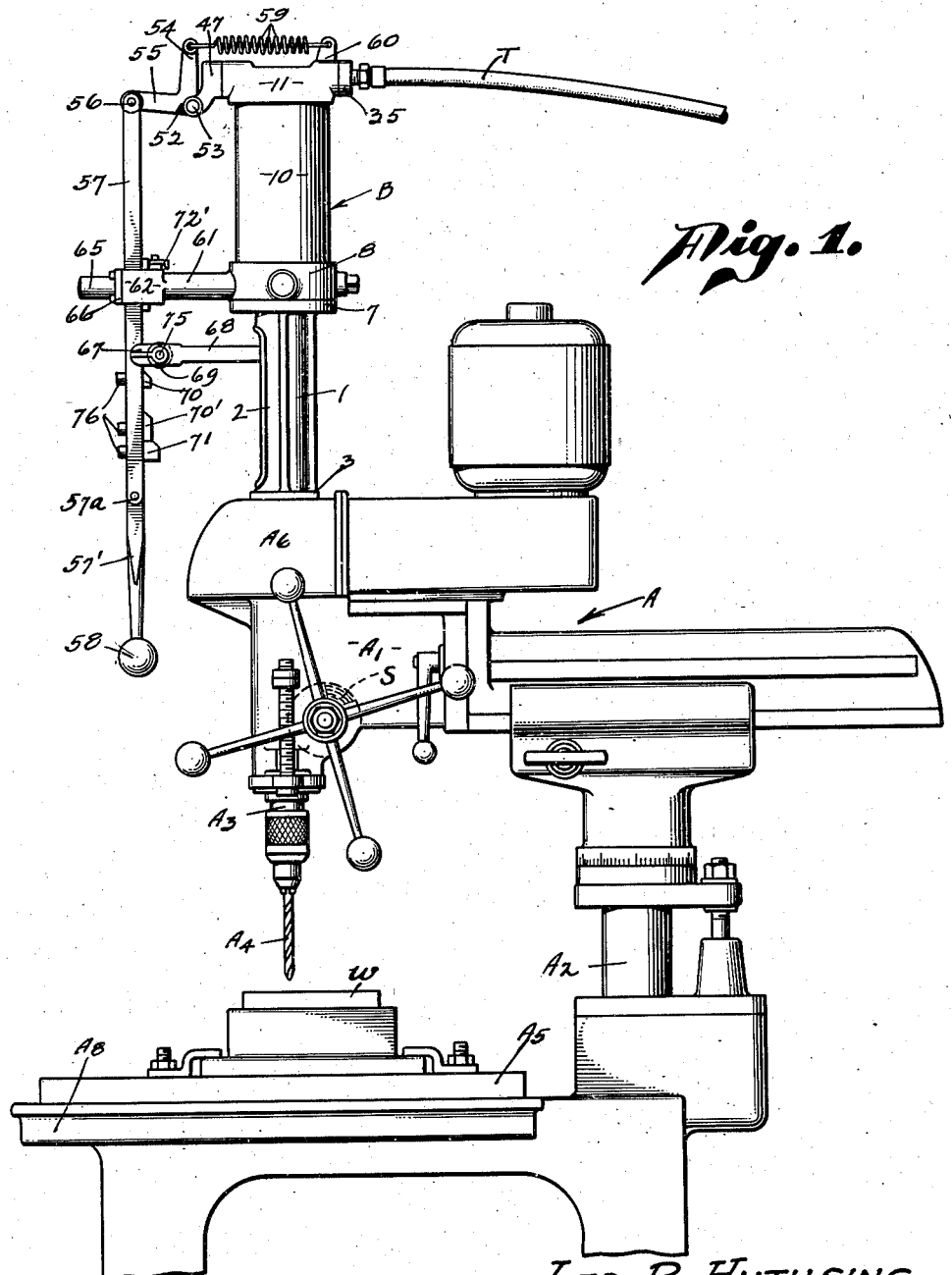
Fig. 1 is an elevation of my control mechanism mounted on a conventional drill press.
Figures 2, 3:
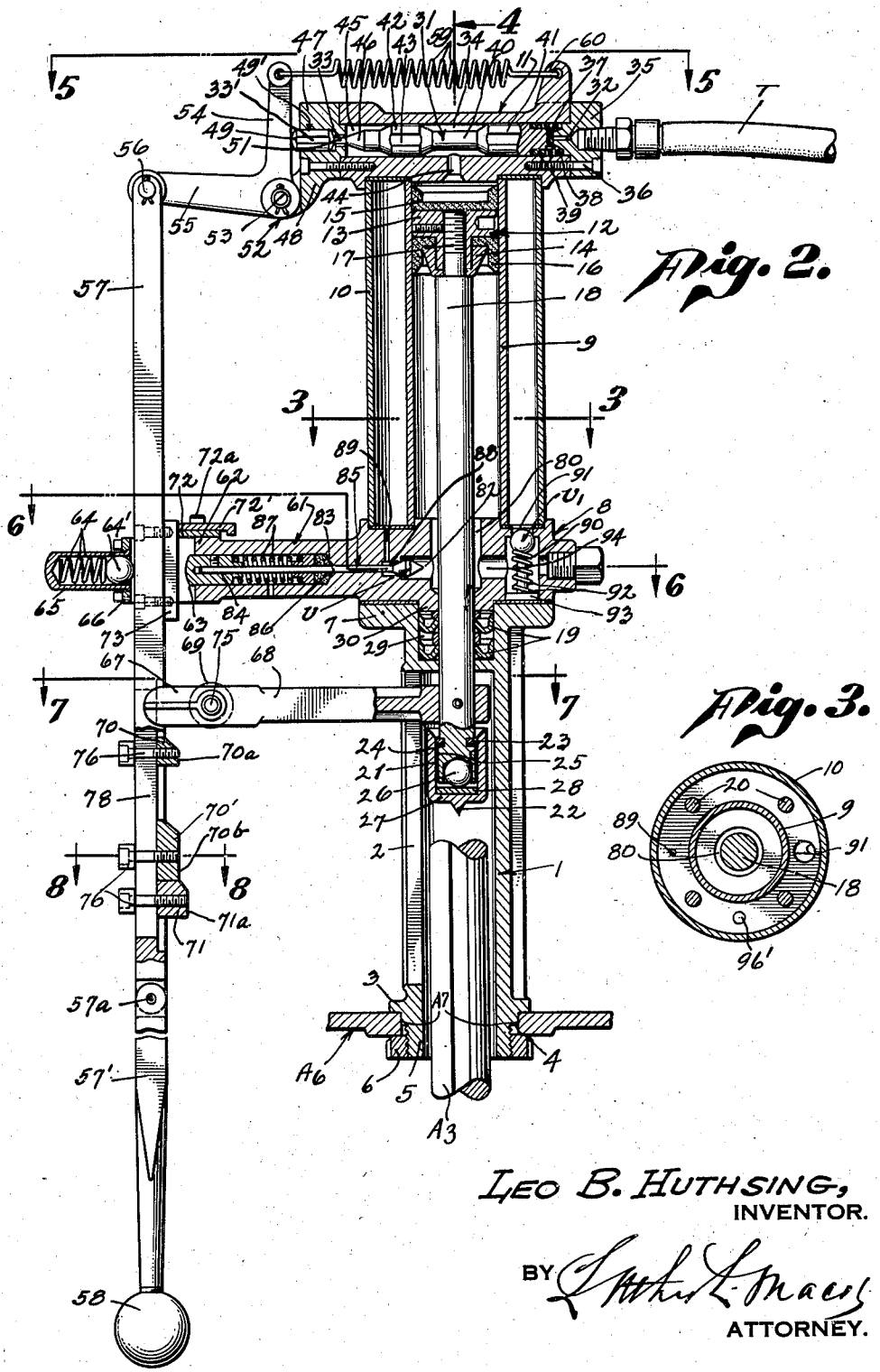
Fig. 2 is a sectional elevation of the control mechanism showing the means for attaching it to a stationary part of a drill press, on line 2—2 of Fig. 6.
Fig. 3 is a section in the plane of line 3—3 of Fig. 2.

In Fig. 1, I have shown a conventional drill press A to which my assembled control unit B is attached. The press A includes the usual drill head $A_1$ adjustable on column $A_2$, a quill $A_3$ which is longitudinally adjustable in head $A_1$ and is arranged to support a tool $A_4$ for operation on a piece of work W supported on a table $A_5$. Control unit B is adapted to be applied to a housing $A_6$ at the top of the drill head and which encloses a cone pulley or a gear train operatively connected with the quill for rotating the tool. Usually the top of housing $A_6$ has an opening $A_7$ alined with the axis of the tool and my control unit B is arranged for attachment to said housing, as will hereinafter be explained.

The control unit B includes a rigid frame 1 of skeleton cross section with at least one elongated opening 2 formed therein, an annular flange 3 adapted to engage the upper surface of housing $A_6$, a circular portion 4 below said flange adapted to fit into opening $A_7$, and a threaded end portion 5 to which a nut 6 is applied within the housing $A_6$, for the purpose of rigidly holding the unit B on the housing.

Frame 1 has a flanged portion 7 substantially spaced from flange 3 to which an intermediate fixture 8 is suitably attached, and unit B also includes a cylinder 9 and an encompassing concentric reservoir 10 which are mounted between fixture 8 and a head 11. Cylinder 9 and reservoir 10 are attached to frame 1 and head 11 as by means of a plurality of stay rods or bolts 20. Cylinder 9 slidably receives a piston 12 which may be of any suitable type, but, as shown, embodies concentric members 13 and 14, on certain sides of which are held a pair of oppositely formed leathers 15 and 16, or equivalent elements, member 13 threadedly receiving a portion 17 of a stem 18. Reservoir 10 has a vent plug 10' carried by head 11 so that the reservoir cannot build up pressure. The lower or opposite end of stem 18 carries a swivel attaching member 21 with a conical center 22 adapted to seat in the adjacent end of quill A3. Member 21 carries a split ring 23 which is carried in a groove 24 of stem 18 and the outer surface of which frictionally engages the surface of a bore 25 formed in the cuplike member 21. A single ball 26 provides a frictionless bearing between the end of stem 18 and the bottom 27 of bore 25 but preferably a hardened steel disc 28 is carried in the bottom of bore 25 for engagement with the ball.

Frame 1 is bored at 29 to receive a boss 30 of fixture 8 and one or more cupped annular packing elements 19 are held in bore 29 between the end of boss 30 and the bottom of the bore for preventing leakage of fluid around the piston stem.

Head 11 is arranged to admit and exhaust air or other fluid from that portion of cylinder 9 between the head and the piston 12 and houses a diametrically disposed valve member generally represented at 31 and interposed between an air inlet 32 and an air outlet 33 at opposite ends of the head. Said head has a diametrically disposed bore 34 extending from end to end thereof which is closed at the intake end by means of a fitting 35 in which air inlet 32 is formed and provided with means for attaching a tube T leading to a source of compressed air supply. Fitting 35 may be attached to the end of head 11 as by means of screws 36 or otherwise. Inlet 32 is adapted to be closed by means of a valve 37 attached to the adjacent end of valve member 31, and a chamber 38 is formed in head 11 for housing a compression spring 39 between the adjacent ends of valve member 31 and closure 35, and also for receiving air from a source for direction, as hereinafter explained, to the cylinder 9.

Valve member 31 has a central reduced portion 40 on opposite ends of which are enlargements 41 and 42 of corresponding diameter and peripherally fitting the bore 34. Portions 41 and 42 have peripheral grooves or flutes 43 extending from end to end thereof so that air admitted to cylinder 9 from inlet 32 may flow through a port 44 into cylinder 9 and air exhausted from said cylinder may flow through said port to an exhaust chamber 45 intermediate the outlet 33 and the adjacent end of portion 42 under the control of valve 37 and an exhaust valve 46, respectively.

The exhaust end of head 11 is closed by means of a fixture 47 and a bracket 48 which are attached to the head in a manner similar to the closure 35 at the intake end of the head, or otherwise. Outlets 33' are formed as grooves in a freely floating member 49 which is movable in a bore 49', and is in communication with bore 34 but under the control of valve 46 integral with the general valve assembly 31 and is adapted to operate in unison with the inlet valve 37. Thus, the inlet and outlet valves operate together for alternately opening and closing cylinder 9 to the inflow of air and the exhaust of air therefrom upon reverse strokes of the piston in the cylinder.

Member 49 is axially alined with valve 31 and is adapted at times to engage a stem 51 of valve 46 as when said valve is closed. Bracket 48 supports a bell crank 52 on a fulcrum 53 and has an upwardly extended arm 54 engageable with member 49, and a right angularly disposed arm 55. Said bell crank is pivotally connected at 56 with an operating and control member 57 which substantially parallels the axis of cylinder 9, and in the event of its attachment to a drill press, as shown, is practically vertically disposed and carries on its lower end a knob 58 whereby said member may be grasped by an operator for instituting an operation of the press and accompanying attachment.

Bell crank 52 is tensioned as by means of a tension spring 59 connecting its arm 54 with a lug 60 on head 11. Hence, the tension of spring 59 tends to urge arm 55 of the bell crank and the member 57 upwardly to normal position. However, fixture 8 has a radially extended arm 61 with a bifurcated portion 62 which provides a recess 63 through which member 57 extends and in which the same is confined except to permit a slight lateral movement on its pivot 56. Member 57 is urged inwardly in the direction of the axis of cylinder 9 by means of a compression spring 64 and ball 64' which are housed in a tubular portion 65 of a closure 66 affixed suitably to the end of arm 61, for purposes to be hereinafter described.

Member 57 also extends between spaced furcations 67, on an arm 68 which is fixed to piston stem 18 and projects through an opening 2 in frame 1. Between the furcations 67 a roller 69 is mounted on arm 68 for engagement with the inner edge of member 57, or at times with cam elements 70, 70' and 71, whereby, upon ascent and descent of the piston and the tool, the movement thereof may be accelerated or decelerated to a selected extent as will hereinafter appear.

Arm 61 carries plates 72 and 72' which are adapted to selectively engage the upper end of a latch bar 73 attached to the inner edge of member 57, or in lieu thereof another type of abutment, whereby upon the descent of member 57 to a desired extent, said member may be locked in lowered position by reason of the tension of spring 64 and the lateral movement of member 57 controlled. Roller 69 is rotatable on a pin 75 held in furcations 67, 67 of arm 68, and is adapted to engage the inner edge of member 57 and the cam elements 70, 70' and 71 as the piston and tool are moved downwardly, or otherwise, in the direction of the work and as it is advanced through the work W which is supported on a bed A8 of the press.

Cam elements 70 and 70', of which there may be any desired number of requisite conformation, are adjustable on member 57 as by means of adjustors 76 which are preferably in the form of screws which are attached to the cams, and are adjustable in elongated slots 78 in member 57, for the purpose of locating the cams at selected points thereof, said adjustors, of course, serving to hold the cams in adjusted positions.

It will be remembered that valve 31 controls the inflow and exhaust of air to and from cylinder 9, respectively, for regulating the operation of the piston on its operative stroke and for exhausting air from the cylinder on a retractive stroke of the piston. It may be also understood that when valve 31 is set to admit air to cylinder 9 at the adjacent end of the piston 12, because that portion of the cylinder which is on the opposite side of the piston is filled with oil or other non-compressible fluid, the piston is free to move, and thus advance the tool in the direction of the work, only when and to such an extent as it is possible to evacuate the oil from the tool side of the cylinder through fixture 8 and into the reservoir 10.

Hence, I have provided, preferably in fixture 8, means for controlling the flow of oil from the reservoir to cylinder 9, and vice versa, which I will now describe. The fixture 8 has a central chamber 80 concentric with stem 18 which is in communication, at times, with reservoir 10, for alternately evacuating oil from cylinder 9 to the reservoir and vice versa. Because of the desirability of providing a differential between the advancing and working movements of the tool in order that the speed of the advancing, initial or alternate movements may be more rapid than the working speed, I have shown and utilize three separate valves, V, $V_1$ and $V_2$ for regulating the flow of fluid between cylinder 9 and reservoir 10.

Valve V is opened by the manual setting of operating member 57 and initiates the descent or advance of piston 12 in cylinder 9 in the direction of the work for transferring fluid from the cylinder to the reservoir to the point where the tool engages the work at a relatively rapid rate of speed. The engagement of roller 69 with the first cam element 70, effects the partial retraction of member 57 from position of engagement with plate 72 and permits the closing of valve V against the further flow of fluid from the cylinder to the reservoir.

Valve $V_1$ on the other hand, permits the flow of fluid from the reservoir to the cylinder on a reverse stroke of the piston, and valve $V_2$ regulates the flow of fluid from the cylinder to the reservoir during the period of time the tool is progressing through the work in operative cycles as when roller 69 is engaged with cams 70 or 70'. In this connection it will be noted that valve V is controlled by the operating member 57, valve $V_1$ becomes operative on the return stroke of the piston, and valve $V_2$ is manually controlled for regulating the volume of fluid transferred from the cylinder to the reservoir in accordance with the spacing of the work from the tool, as well as the relative spacing of successive portions of work capable of being operated upon in a single cycle of operation.

Valve V is radially disposed in fixture 8 of the frame in a chamber 82 of fixture 8 and, in addition to an elongated stem 83, includes a head 84 which slides in and projects beyond the outer end of arm 61 and is adapted to engage either the inner edge of member 57 or latch bar 73. Head 84 is affixed to stem 83 which is slidable in a bore 85 of arm 61 and a packing gland 86. Said valve is tensioned by a spring 87 compressed between adjacent ends of head 84 and said gland. The valve is seated in chamber 82 so as to close a passage 88 which communicates with reservoir 10, as by means of a passage 89. Spring 87, therefore, tends to hold valve V in closed position but is compressible by member 57 when the bar 73 engages head 84.

While valve V controls the flow of fluid from cylinder 9 to reservoir 10 under certain conditions, valve $V_1$ is mounted in fixture 8 in a bore 90 which communicates with reservoir 10 by means of a port 91. Valve $V_1$ may, as shown, have the form of a ball, and is held seated at the end of port 91 by means of a spring 92, which is compressed between the valve and a member 93 at the end of bore 90 adjacent flange 7. Bore 90 is in communication with chamber 80 as by means of a radial passage 94, and on the downstroke of the piston 12, valve $V_1$ prevents flow of fluid from cylinder 9 through port 91 to reservoir 10, but on the upstroke of the piston, due to the suction in the cylinder, permits the flow of fluid from the reservoir to the cylinder.

Valve $V_2$, as mentioned, is effective for controlling the flow of fluid from cylinder 9 to reservoir 10 on the down-stroke of the piston 12 during the periods in which the tool is operative. Valve $V_2$ is of needle type and seats on an end of a restricted passage 95 which leads from chamber 80 to a valve chamber 96 closed by a threadedly connected portion 97, said valve has a manually operable stem 98 extended through mounting 97 attached to the exterior of fixture 8 and a knob or head 99 attached to its stem, whereby the valve may be advanced or retracted selectively for correspondingly opening and closing the passage 95 to the passage of a fluid therethrough, thence through chamber 96 and a port 96' to reservoir 10.

It should be understood that the volume of oil or fluid resident in the portion of cylinder 9 below the piston or adjacent the fixture 8 is only sufficient to fill the unoccupied portion of said cylinder. Upon the transfer of fluid from cylinder 9 there is no aerostatic head above the volume of oil in the reservoir, and, therefore, no resistance to the inflow of oil from the cylinder upon the downstroke of the piston 12, due to the provision of air vent 10'.

The cams 70, 70' and 71 may possess necessary characteristics for opening and closing valve V for performing a particular kind of work to be done, depending upon the type of material to be operated on as well as the spacing of different portions of the work to be drilled, reamed, tapped, or otherwise tooled, and the efficient speed of progress desired for the tool through one or more portions of the work.

Summarizing the operating cycles of my mechanism, it will be observed that the tool $A_4$ and its supporting spindle or quill $A_3$, piston 12 and operating member 57 are at rest at their upper or remotest extremes of movement at the institution of an operation. At such times the valves V and $V_1$ are closed, while, of course, valve $V_2$ is open to a desired extent, and the air inlet valve 31 is closed and the air exhaust 46 is open. Cams 70, 70' and 71, or any of them, or additional cams if any, are set in accordance with the work to be done by the tool.

Whereupon, the movement of member 57 downwardly and the latching thereof in adjusted position under plate 72 effects the opening of air inlet valve 31 and also hydraulic valve V. Thus, the piston 12 is urged downwardly by air pressure until cam 70 is engaged by roller 69 which effects a partial lateral retractive movement of member 57 sufficient to permit the closing of valve V, but not sufficient to release the member 57 from plate 72 or 72'. The engagement of roller 69 with cam 70 occurs at about the time the tool engages the initial portion of the work. Prior to such engagement the piston 12 moves rapidly because of the free flow of fluid from cylinder 9 to reservoir 10 but following such engagement the piston moves far more slowly and only at such a speed as is practicable for the tool to progress through the work, as may be controlled by the restricted flow of fluid by valve $V_2$ which has been previously adjusted to a selected extent.

When and if the roller 69 reaches a point of engagement with another cam 70', the member 57 is again moved laterally by such cam and is held in such adjusted position until the tool again reaches a position of engagement with another portion of the work. It will be understood that member 57 is tensioned by its spring 64 so that when roller 69 moves over a cam 70 or 70' said member 57 will retract inwardly. Thus, member 57 is not released from plates 72 and 72' until the completion of a desired operating cycle. The flat faces 70a and 70b of cams 70 and 70', respectively, regulate the distance which tool A4 progresses through the work. Cam 71, however, is of such a form that when its face 71a is engaged by roller 69 at a certain point, the member 57 will be moved sufficiently to release and unlatch it from plates 72 and 72' and thus permit the retraction of the member 57 upwardly to normal position in readiness for an ensuing operation when the lever again is pulled downwardly. Plate 72' is adjustable on plate 72 as by means of a set screw 72a or otherwise so as to limit the inward movement or the upward retractive movement of member 57 to a desired extent and also for regulating valve V.

Valve V serves to rapidly evacuate the cylinder 9 of fluid, when it is open, and while roller 69 traverses faces 70a and 70b of the cams 70 and 70' initial to and between succeeding operations on the work in a single cycle. Valve V2 controls the transfer of the fluid from the cylinder 9 to reservoir 10 during drilling operations, and valve V1 controls the flow of fluid from the reservoir back to the cylinder at the close of each operation. Member 57 may have an extension 57' hinged thereto at 57a to which knob 58 is attached.

In machine tools of the character herein mentioned, particularly drill presses, the quill and tool are manually depressed into position for operatively engaging the tool with the work and upon release thereof after the completion of an operation the same are tensioned by a suitable spring S for automatic restoration to normal position. Hence, such conventional means is utilized on machine tools to which my attachment may be applied so that the piston 12 will be restored to normal position with the restoration of the tool. Valve V1 is therefore of such form and character as to permit free upward movement of the piston and the free flow of fluid from reservoir 10 to cylinder 9 due to the suction created by the piston and the tension of the tool restoring spring.

It is apparent, then, that when my improvements are applied to a machine tool of the character mentioned, each operation is instituted by pulling member 57 downwardly until it becomes latched ether under plate 72 or plate 72' and the further operation of the tool is automatically effected without manual effort or attention throughout one or more drilling, or other type of operating cycles with respect to a single piece or several pieces of work in which the holes are axially alined. It is obvious that if more than one hole is drilled, reamed, or tapped in a single operation of the device, each hole will require a cam 70 or 70' attached to member 57 and all of such cams will be spaced on member 57 to correspond to the spacing of the portions of the work having or requiring such holes, and will have their faces 70a or 70b of such extent as will correspond to the respective extent, in each case, of a particular operation.

Certain advantages of the present invention will appear from a reading of the foregoing part of the specification. Other advantages arise from the provision of a control mechanism which can be easily attached to a conventional drill press as a single unit and be operatively connected therewith so as to permit the drill press to be manually controlled, as before, or automatically controlled by the mechanism, or in part manually controlled and in part automatically controlled while drilling a single hole. The change from manual to automatic control can be made instantly and by an inexperienced operator of a drill press.

Another advantage arises from the provision of an actuating means for my controlled mechanism requiring only a very light initial pull downwardly to make the control mechanism operative.

What I claim is:

1. A control attachment providing optional automatic control for machine tools having a reciprocably mounted tool carrying spindle manually operated means for feeding the spindle toward the work, and mechanical means acting to return the spindle to initial position, including: a housing adapted to be mounted on said machine axially of said spindle and having a longitudinally extending slot therein; a cylinder and a hydraulic reservoir contained in said housing, a piston in said cylinder, said reservoir communicating with said cylinder below said piston; a valve housing provided with an inlet port for compressed air, an exhaust port for compressed air, and communicating with said cylinder above said piston, valve means mounted in said housing and controlling the admission of air to said cylinder while closing said exhaust port, and the exhaust of air from said cylinder while closing said air inlet port; a stem secured to said piston and arranged to extend into contact with the upper end of said spindle; an arm rigidly mounted on said stem and projecting through the slot in said housing; an elongated control member mounted on said housing and extending downwardly for longitudinal movement, and movement to and from the axis of said cylinder and spindle; resilient means acting to urge said control member toward said axis, and to resist longitudinal movement of said elongated control member, the longitudinal movement of said control member against the effort of said resilient means acting to operate said valve to admit air to said cylinder to initiate the operative movement of said piston on said spindle; an adjustable latch acting to hold said control member in longitudinally displaced condition and at a selected distance from the axis of the spindle; a first valve means controlling the flow of hydraulic fluid from below said piston to said reservoir and held open by the control member under the action of said resilient means; further valve means adjustable to control the rate of flow of hydraulic fluid from under said piston to said reservoir and to provide a fast flow of oil from said reservoir to under said piston on the return stroke thereof; and a plurality of cam elements adjustably secured on said control member in the path of said arm mounted on said stem, the action of said cam elements being to laterally displace said control member to close said first valve means until the projecting arm has passed beyond said cam means, the last of said cam means being of a shape to cause disengagement of said control member from said latch and enable the resilient means to return it to initial position, manual operation of the machine being resumed at any time by manually releasing the control member from engagement with the elements co-operating therewith and automatic control being resumable at any time during the operative stroke of the machine by again latching the operating member in position.

2. A control attachment providing optional automatic control for machine tools having a reciprocably mounted tool carrying spindle, manually operated means for feeding the spindle toward the work, and mechanical means acting to return the spindle to initial position including: a housing adapted to be mounted on said machine axially of said spindle and having a longitudinally extending slot therein; a cylinder in said housing; a piston in said cylinder; a hydraulic reservoir and a plurality of conduits connecting the reservoir with the cylinder below said piston; a valve housing provided with an inlet port for compressed air, an exhaust port for compressed air, and communicating with said cylinder above said piston, valve means mounted in said housing and controlling the admission of air to said cylinder while closing said exhaust port, and the exhaust of air from said cylinder while closing said air inlet port; a stem secured to said piston and arranged to extend into contact with the upper end of said spindle; an arm rigidly mounted on said stem and projecting through the slot in said housing; an elongated control member mounted on said housing and extending downwardly for longitudinal movement, and movement to and from the axis of said spindle and cylinder; resilient means acting to urge said control member toward said axis, and to resist longitudinal movement of said elongated control member, the longitudinal movement of said control member against the effort of said resilient means acting to operate said valve to admit air to said cylinder to initiate the operative movement of said piston on said spindle; an adjustable latch acting to hold said control member in longitudinally displaced condition and at a selected distance from the axis of the spindle; a first valve means controlling the flow of hydraulic fluid from below said piston to said reservoir and held open by the control member under the action of said resilient means; further valve means adjustable to control the rate of flow of hydraulic fluid from under said piston to said reservoir and to provide a fast flow of oil from said reservoir to under said piston on the return stroke thereof; and a plurality of cam elements adjustably secured on said control member in the path of said arm mounted on said stem, the action of said cam elements being to laterally displace said control member to close said first valve means until the projecting arm has passed beyond said cam means, the last of said cam means being of shape to cause disengagement of said control member from said latch and enable the resilient means to return it to initial position, manual operation of the machine being resumed at any time by manually releasing the control member from engagement with the elements co-operating therewith and automatic control being resumable at any time during the operative stroke of the machine by again latching the operating member in position.

3. A control unit adapted to be mounted axially of the tool spindle of machine tools and providing optional automatic control for such tools having a reciprocably mounted tool carrying spindle, means for feeding the spindle toward the work and means for returning the spindle to initial position, including: a cylinder; a piston in said cylinder; a hydraulic reservoir and a plurality of conduits connecting the reservoir with the cylinder on the spindle side of said piston; an inlet port for compressed air, and an exhaust port communicating with the cylinder on the side of the piston remote from the spindle; valve means controlling the admission of air to the cylinder through the inlet port while closing the exhaust port and the exhaust of air from the cylinder while closing the air inlet port; a stem secured to said piston and arranged to bear against the inner end of the tool spindle; an arm rigidly mounted on said stem and projecting outwardly from the axis of the spindle; an elongated control member mounted on said tool and extending downwardly for longitudinal movement, and movement to and from the axis of said cylinder and spindle; resilient means acting to urge said control member toward said axis, and to resist longitudinal movement of said elongated control member, the longitudinal movement of said control member against the effort of said resilient means acting to operate said valve to admit air to said cylinder to initiate the operative movement of said piston on said spindle; an adjustable latch acting to hold said control member in longitudinally displaced condition and at a selected distance from the axis of the spindle; a first valve means controlling the flow of hydraulic fluid from below said piston to said reservoir and held open by the control member under the action of said resilient means; further valve means adjustable to control the rate of flow of hydraulic fluid from under said piston to said reservoir and to provide a fast flow of oil from said reservoir to under said piston on the return stroke thereof; and a plurality of cam elements adjustably secured on said control member in the path of said arm mounted on said stem, the action of said cam elements being to laterally displace said control member to close said first valve means until the projecting arm has passed beyond said cam means, the last of said cam means being of a shape to cause disengagement of said control member from said latch and enable the resilient means to return it to initial position, manual operation of the machine being resumed at any time by manually releasing the control member from engagement with the elements co-operating therewith and automatic control being resumable at any time during the operative stroke of the machine by again latching the operating member in position.

4. A control attachment as set forth in claim 1 in which the housing is mounted on top of a drill press housing.

5. A control unit as set forth in claim 3, in which said unit is mounted on top of a drill press housing.

LEO B. HUTHSING.

REFERENCES CITED

The following references are of record in the file of this patent:

UNITED STATES PATENTS

| Number | Name | Date |
| --- | --- | --- |
| 706,688 | Reynders et al. | Aug. 12, 1902 |
| 1,046,311 | Lassiter et al. | Dec. 3, 1912 |
| 1,069,995 | Anderson | Aug. 12, 1913 |
| 1,307,547 | Hasty | June 24, 1919 |
| 1,316,236 | Hoffman | Sept. 16, 1919 |
| 1,812,533 | Hunt | June 30, 1931 |
| 1,816,829 | De Leeuw | Aug. 4, 1931 |
| 1,942,414 | Dumser et al. | Jan. 9, 1934 |
| 1,979,710 | Schafer | Nov. 6, 1934 |
| 2,079,640 | Vickers et al. | May 11, 1937 |